United States Patent [19]

Abramatic et al.

[11] Patent Number: 4,546,383
[45] Date of Patent: Oct. 8, 1985

[54] METHOD AND APPARATUS FOR VISUAL TELECOMMUNICATIONS, IN PARTICULAR FOR USE BY THE DEAF

[75] Inventors: Jean-François Abramatic, Noisy le Roi; Morton Nadler, La Celle Saint Cloud; Philippe Letellier, Versailles, all of France

[73] Assignee: INRIA Institute National de Recherche en Informatique et en Automatique, Le Chesnay, France

[21] Appl. No.: 505,309

[22] Filed: Jun. 17, 1983

[30] Foreign Application Priority Data

Jun. 18, 1982 [FR] France ................. 82 10759

[51] Int. Cl.⁴ ............................................. H04N 7/14
[52] U.S. Cl. .................................. 358/85; 358/96; 358/135
[58] Field of Search ............ 358/96, 85, 105, 133, 358/135, 138; 179/2 TV

[56] References Cited

U.S. PATENT DOCUMENTS

| | | | |
|---|---|---|---|
| 3,746,793 | 7/1973 | Sachs et al. | 179/2 TV |
| 3,767,847 | 10/1973 | Haskell et al. | 358/135 |
| 4,027,331 | 5/1977 | Nicol | 358/135 |
| 4,075,658 | 2/1978 | de Cosnac et al. | 358/96 |
| 4,090,221 | 5/1978 | Connor | 358/105 |

OTHER PUBLICATIONS

"An Experimental Visual Telephone System for the Deaf"; Television, vol. 16, #2, pp. 6-10; Pearson and Summer; Mar. 1976.
Conference Record of International Conference on Communications held in Denver, Colo.-Jun. 1981 (vol. 2 of 4).
Article "TRIDEC System Design" from vol. 25, No. 11-12 of Review of the Electrical Communication Laboratories.
Article "Interframe-Codierung für Videosignale"-Internationale Elektronische Rundschau, 1973, vol. 27, Jan. (No. 1).

Primary Examiner—Howard W. Britton
Assistant Examiner—Victor R. Kostak
Attorney, Agent, or Firm—Karl F. Ross; Herbert Dubno

[57] ABSTRACT

In a system for visual telecommunications, e.g. for use by deaf people, an electronic camera (20) makes an image of a moving subject for transmission. The TV type image is passed through a contour extractor (25) to be converted to an animated cartoon line-drawing type image. The contour image is then compressed by means including a sampler (28) for image reduction, a difference detector (30) for selecting only points which change from one image to the next, a filter (34) for rejecting isolated points in the contour image, and an encoder (36) for converting sequences of on/off bits into data words for transmission, via a modem (14) over a telephone line (15). At the other end of the line a similar transmitter/receiver system decodes the received words and reconstitutes the successive images for display on a screen (46). The resulting animated cartoon type of display is adequate for communication by sign language or by lip reading, and is capable of being sufficiently compressed to be transmitted over a normal telephone line.

19 Claims, 12 Drawing Figures

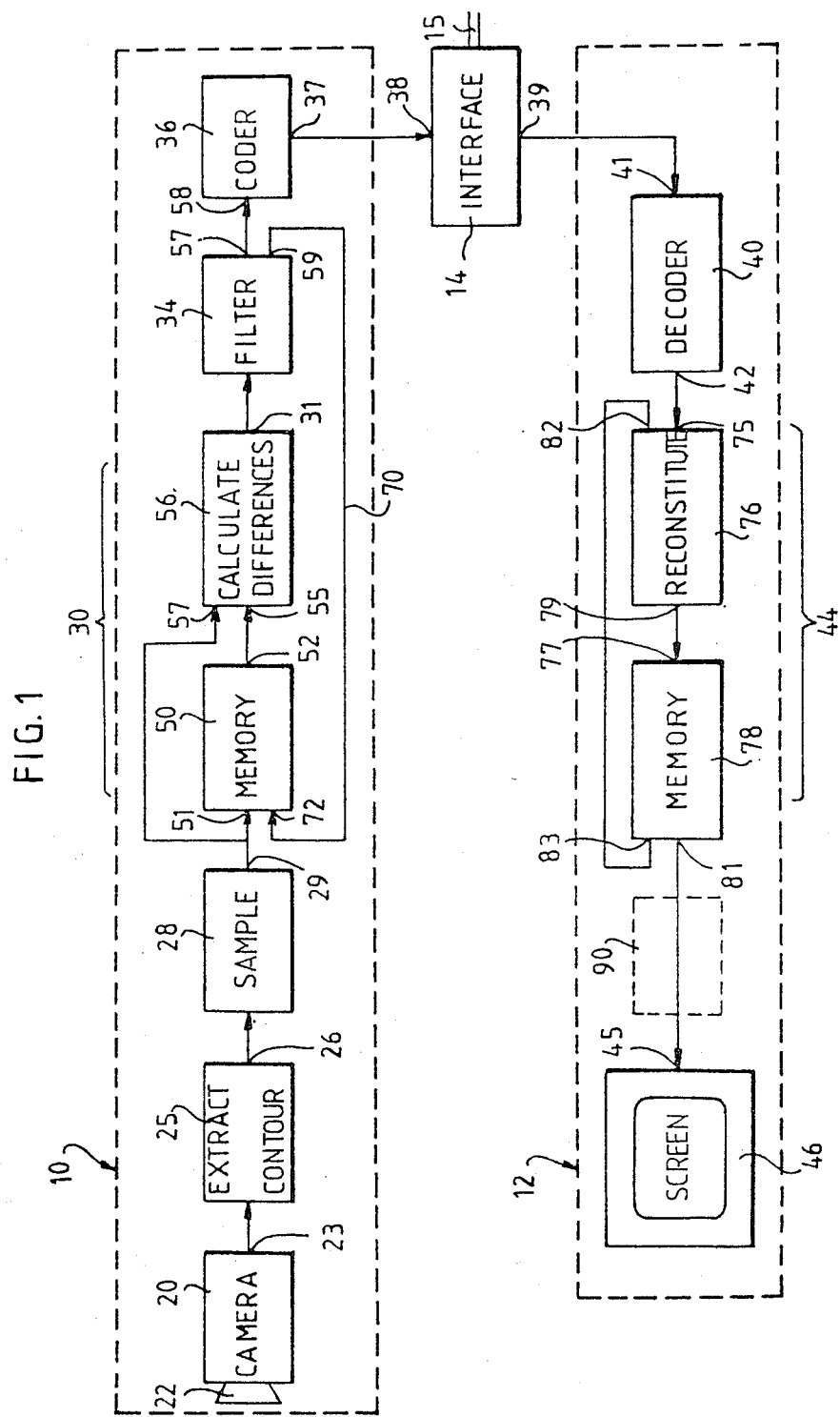

FIG. 2A
FIG. 2B
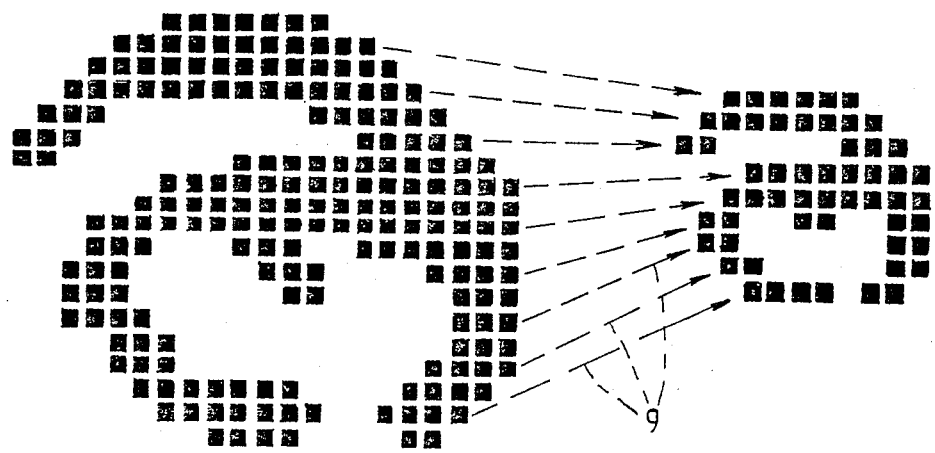
FIG. 2C
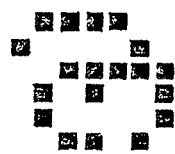
FIG. 2D
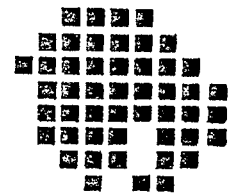

METHOD AND APPARATUS FOR VISUAL TELECOMMUNICATIONS, IN PARTICULAR FOR USE BY THE DEAF

FIELD OF THE INVENTION

The present invention relates to telecommunications, and in particular to telecommunications by telephone or telematics lines. The invention aims more particularly at transmitting images over such links, where it is understood that telephone links are not limited to cables or electric lines but also include communication links such as microwaves, optical fibers, etc.

BACKGROUND OF THE INVENTION

Telephone lines have traditionally been developed and installed in networks for transmitting voice communications. More recently, they have found a use in transmitting digital type data, by means of modulator-demodulators generally known as modems. Such telephone links have transmission characteristics which are well adapted to transmitting analog signals at frequencies of not more than about 4 kHz. When they are used for transmitting digital signals, they tend to be useable at data rates of up to about 4800 bauds. Such performance limits the volume of information which may be transmitted in given time.

Thus, while telephone lines are well adapted to transmitting human speech or to transmitting computer messages in the form of relatively low data rate binary signals, they are not suitable for real time transmission of images which are liable to change quickly in time. Image transmission requires a relatively large amount of information to be transferred in comparison to the volume of information needed for a voice message. The image must be divided into point-like zones or "pixels" which are smaller with increasing definition to be transmitted. A signal representative of the brightness of each pixel must be produced. The set of such signals must then be transmitted, generally in series in the form of a sequence. Each sequence corresponds to an image, and the level of the signal at a given instant in the sequence corresponds to the brightness of a corresponding point in the transmitted image.

Such sequences are transmitted, as is well known, in television systems. In order to show moving scenes in such systems, the transmitted images must be renewed at a relatively high rate. It is necessary to have links capable of transmitting a frequency band whose width is orders of magnitude greater than the bandwidth of single telephone links.

Attempts have already been made to improve the comfort of telephone communications by transmitting the parties' images to each other by means of such a TV-like system which is generally called a visiphone. The development of such systems has been held back by their cost which is particularly related to the fact that the information transmission capacity required for transmitting adequate images is twenty to forty times greater than the capacity needed for a speech only telephone line.

When the images to be transmitted are relatively static, proposals have already been made for reducing the data transmission rate. One such system is described in a paper entitled "Video teleconferencing at 9600 bauds" by Robert H. Wallis and William K. Pratt in the "IEEE Picture Coding Symposium, Montréal 1981. An opto-electronic cine-camera is used to produce a transmissible image of a subject such as the head and shoulders of a speaker in a remote conference. The resulting electrical signals are converted into binary in such a manner that each "pixel" is represented by a signal capable of taking only two values. The resulting sequence obtained for the image is then subjected to a coding process capable of compressing the information content in the sequence so that it may be transmitted over a telematics line at a rate of about 9,600 bauds. Images obtained by this procedure are of relatively poor quality, even when the image renewal rate is limited to only a few images per second. This technique is thus not suitable for real time re-transmission of scenes in which movement must be produced to some degree of accuracy.

OBJECTS OF THE INVENTION

It is the object of the present invention to provide a method and apparatus for real time transmission of varying visual information over a telephone line or a telematics line having equivalent data rate performance. The invention is aimed in particular at transmitting information corresponding to movements of the human body, eg. to gestures or to lip movements. In this respect, one application of the invention consists in supplying a telecommunications system for people suffering from deafness but who are capable of communicating by sign language or of understanding speech by lip reading.

SUMMARY OF THE INVENTION

To this end, the present invention provides a method of transmitting visual information over a telecommunications network, the method being of the type in which the information is observed as a stationary image, digital signals corresponding to each image point are generated, and the digital signals are transmitted over a network line to be received by a receiver connected to the network and then decoded to enable the corresponding image to be displayed. The improvement in the method lies in converting the signals representative of each image into binary signals by discriminating on the basis of differences in brightness between neighboring points in image in order to obtain a sequence of electric signals representative of the contours in the original image, said contour-representing signals then being digitally encoded and transmitted over the network.

In a preferred implementation, the contour-representing signals are compressed before being encoded for transmission. The compression may take various forms, which may be applied in a cumulative manner.

One preferred form of compression consists in detecting variations between one image and the next, said variations being representative of movement by the subject whose image is to be transmitted. The detection may take place by a point-by-point comparison of the successive images in such a manner as to forward only signals representative of those parts of the contour which change position from one image to the next. At the receiver end, an image reconstruction process is then used which receives said movement-representing signals together with signals representative of one or more previously reconstructed images to reconstruct the current image.

Thus the invention is based in the observation that there are applications in which the richness of image provided by a television system is not strictly necessary, and in which the subject matter to be communicated can usefully be represented by a contour image analogous to a line drawing. The drawing changes over time as the subject in the original scene moves.

The transmitted image can thus be compared to an animated cartoon. It has been observed in particular that transmission of such a cartoon-like image is quite acceptable for lip-reading or for communicating sign language such as used by the deaf and dumb. For sign language in particular, the drawing-like nature of the transmitted image can enhance understanding.

One particularly advantageous implementation of the method consists in extracting contours from a relatively high definition image, and then in sampling the high-definition contour image in blocks of four or nine (ie. reducing groups of four or nine adjacent high definition points to a single low-definition point) thereby reducing processing and transmission capacity requirements downstream from the sampler by a factor of four or nine. It may also be advantageous to filter signals prior to their application to a telephone line interface in such a manner as to eliminate isolated points in the image or drawing to be transmitted.

The invention also provides a device for real-time generation of electrical signals representative of visual information and which may be used to implement the above-defined method. For this purpose, such a device comprises, in particular, a camera, a contour extractor device, and means for compressing the data in each image-representing data sequence for transmission over a telephone line or for intermediate storage at a data rate comparable to the data capacity of a telephone line. In addition to an encoding device, the compression means may include means sensitive to changes between successive "drawings" from the contour extractor. The compression means may also include filter means for eliminating isolated points and possibly also for distinguishing points whose position does not vary significantly from one image to the next.

The invention also provides a transmitter/receiver system for producing signals representative of visual information using the principles outlined above and for displaying an image on the basis of signals generated in that manner. The receiver portion includes, in particular, display means suitable for reproducing successive images of the animated cartoon transmitted by such signals. When the encoding takes changes from one image to the next into account, the receiver should include storage means for successive reconstituted images.

BRIEF DESCRIPTION OF THE DRAWING

An embodiment of the invention is described by way of example with reference to the accompanying drawings, in which:

FIG. 1 is an overall block diagram of a transmitter/receiver system suitable for connection to a telephone line;

FIGS. 2A to 2D are diagrams showing the effect of a sampling device on contour images;

SPECIFIC DESCRIPTION

Figure 3A:
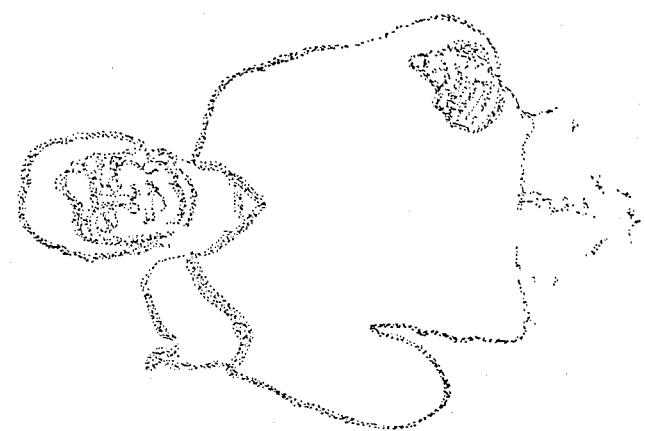
FIGS. 3A to 3C show two successive animated cartoon contour images and a third image showing the difference between the first two due to movement of the subject.

In addition to enabling speakers to see each other, devices for transmitting images over telephone links also enable them to make gestures and to point to things. This amounts to an improvement in the quality of communication which is taking place essentially verbally. Such devices could in theory enable communication with a person who is totally deaf but who is capable of lip-reading, or enable communication between two deaf and dumb people communicating by sign language. However, in so far as visiphone devices are spreading extremely slowly because of the very large quantities of information they need to transmit and the corresponding complexity of the transmission networks that need to be installed, the possibilities of telecommunications open to deaf people are, in practice, very limited.

The studies that lead to the present invention have shown that accurate transmission of lip movements, or of gestures for sign language, must take place at not less than about 12 images per second. This rate is necessary both because of the rapidity of certain gestures and because of the need to avoid eye-strain in the observer by too jerky an image.

Ordinary telephone lines can be used to transmit at up to about 4800 bauds. Such a rate is quite inadequate when using ordinary television type image transmission procedures for transmitting an image such as the head or the head, body and arms of a speaker.

FIG. 1 shows an example of a transmitter/receiver station in accordance with the invention for transmitting visual information such as the movements of the human body. The station comprises a transmitter sub-assembly 10 and a receiver sub-assembly 12 both of which are connected via a conventional interface or modem 14 to a telephone or telematics line 15.

The transmission sub-assembly comprises a camera 20 having a lens 22 suitable for making an image of a subject. The camera is mounted for this purpose on a stand, not shown, in such a manner as to obtain a framed image of a subject facing the transmitter/receiver station 10, 12. The camera 20 is an electronic camera suitable for transforming each image of a subject or a scene formed on its screen into a sequence of electronic signals which appear at an output 23. The signals at the output 23 are supplied to a contour extracting device 25. The contour extracting device may be of a known type such as is described below, and serves to transform the signals of each sequence (each signal representing the brightness level of a corresponding pixel in a half-tone image), into signals capable of taking two levels only (eg. corresponding to black or to white). The black pixels in the resulting image lie for the most part on contours in the original image. Thus the signals which appear at the output 26 from the contour extracting device 25 are representative of a kind of cartoon image animated at a rate of, say, twelve images per second. The data in the contoured signal is then compressed before being applied to the interface 14.

The data is compressed by a series of juxtaposed modules including a sampler 28 which serves to divide the total volume of information to be transmitted in each image by a predetermined factor, and a motion extractor circuit 30 having an output 31 providing signals which correspond to points which have changed brightness level between two successive contoured images. These signals are then applied to a filter device 34 serving to eliminate isolated points and having a coder 36 connected to its output for further compressing data as a function of the data structure as analysed by the coder and then encoded according to a pretermined set of rules. The output 37 from the coder 36 is connected to the send input 38 of the interface 14.

The receive output 39 of the interface 14 is connected to the input 41 of a decoder 40 which applies inverse rules corresponding to the rules used by the coder 36, thereby reestablishing a sequence of electrical signals at its output 42 corresponding to an animated cartoon of the type produced by a second transmitter identical to the device 10, but at the other end of the line 15. The output signals at 42 are processed by an image information restoring device 44 before being applied to the input 45 of a display screen 46 which displays the information transmitted on the line 15 in the form of a sequence of visible images at the appropriate rate.

The camera 20 is preferably of the charge transfer type including a photosensitive array of 256×256 elements such as are now commercially available. Naturally the choice of camera technology is not a limiting factor in the invention, and other opto-electronic conversion devices could also be used. One advantage of the charge transfer type camera is that it does not require a high tension power supply. Each photosensitive element in the camera produces an analog signal whose level is proportional to the brightness received by that element. The pixel brightness levels thus received for a single image are read sequentially and may be digitized by an analog to digital converter so as to produce a frame of 256×256 six-bit words at the output 23 of the camera. The position of each word in the sequence corresponds to the position of a pixel in the image.

The contour extracting device 25 may be made, for example, in accordance with the technique described in published French Pat. No. 2 163 815 filed July 2, 1973 by Nadler, Adamoff and Oisel. Another form of contour extracting device is described in European patent application No. 81 402 085.5 dated Dec. 28, 1981 which readily transforms an image of a natural scene into a contour image. The invention is naturally not limited to either of the above-mentioned contour extracting devices.

Whatever method is used to extract contours, the result is conventionally interpreted as dark lines on a light background, with the lines corresponding to boudaries between different parts of the natural image. An example is shown in FIG. 2A. The contour extracting device reduces the image to binary levels in that each pixel represented in the signal at its output 26 is represented by a single bit of value 0 or 1 depending on whether the pixel is black or white. Contour extracting devices are sensitive to changes in brightness level between neighboring pixels as represented in the signal from the camera 20, ie. between words representative of groups of neighboring pixels. In this respect they differ from clipping devices for reducing an image signal to 0s and 1s depending on whether the signal exceeds a threshold level. This difference remains even if the threshold in question varies according to other criteria.

One of the important underlying principles of the present invention is the observation that sufficient visual information could be transmitted on the basis of the output from a contour extracting device for communication between the deaf and dumb, and further that this communication could be achieved at high enough rates for real time transmission of the information while remaining within the capacity of a telephone line.

The sampler 28 simply serves to compress the image. In practice, the electrical image at the output 23 from the camera 20 is divided into scan "lines" each of which corresponds to one line of photosensitive elements in the array. In the electrical signal each line is separated by an interline separator symbol. The sampler 28 can thus reduce image width by extracting one point in two or one point in three (ie. one bit in two or three as the case may be) along selected line signals, and can also reduce image height by selecting one line in two or three. Arrows 9 link FIG. 2A to FIG. 2B showing the compression which results when selecting one in two. It is clear that FIG. 2B is a compressed version of FIG. 2A.

The sampling may be performed by conventional means, eg. by bit and line counters, or by a suitably programmed microprocessor.

The resulting compression by a factor of four in image area is shown in FIG. 2B. In both FIGS. 2A and 2B, the black and white squares correspond respectively to 1 and 0 level bits in the sequence of signals for each line. Successive lines are progressively further down the image. FIG. 2C shows the effect of area compression by a factor of three (one point in three along one line in three). It has been observed that better results are obtained by starting from a relatively high definition image at the output from the contour extracting device 25 (ie. based on a signal from a camera using a 256×256 matrix) and then reducing the image after the contours have been extracted, than by attempting to extract contours directly from a camera of lower definition. FIG. 2D shows the result of extracting contours from the same subject as was used for FIG. 2A, but using a 128×128 matrix camera. It is clear that FIG. 2D is considerably poorer in information, than is FIG. 2B, or even FIG. 2C.

The data compression begun by the sampler 28 is continued by a series of compression stages aiming at reducing the sampler output data rate by a factor of about twenty before the signal is applied to the input 38 of the interface 14.

The movement information extractor 30 includes a memory 50 capable of storing an entire contour image as applied to its input 51 by the output 29 from the sampler 28. Suitable memory addressing means are provided. The output 52 from the memory 50 is connected to one input 55 of a difference calculator 56 having a second input 57 which is directly connected to the output 29 from the sampler 28. The difference calculator thus performs a point-by-point comparison of successive contour images that appear at the output 29 from the sampler 28. The memory 50 is suitably addressed to produce corresponding points from the previous image at the input 55 in time with the arrival of new points at the input 57. The difference calculator 56 performs an exclusive-OR (XOR) function to provide bits at its output 31 only when the corresponding image bits at its two inputs are different.

More precisely, if a given point in a contour image is at level 1 whereas the corresponding point in the previous image was at level 0, then a level 1 bit appears at the output 31. Similarly, if a given point is currently at level 0 whereas in the previous image it was at level 1, then a level 1 bit also appears at the output 31. However, in the other possible cases (both input bits the same, either both at level 1 or both at level 0) a level 0 signal appears at the output 31. The addressing device for the memory 50 is arranged to read from the memory slightly before writing new information to it to ensure that the previous values are used before being overwritten, this sometimes known as read modified write addressing.

The movement extractor device 30 may be controlled by suitably programmed microprocessors or by other conventional integrated circuits as is well known in the electronics art.

FIG. 3A shows a contour image of the face and body of a subject who is gesturing with the right hand. This figure corresponds to the type of signal which appears at the output from the contour extractor 25.

Figure 3B:
Figure 3C:

FIG. 3B shows the next image in a sequence, and it can be seen that the arm has moved between images. FIG. 3C is an image showing the differences between the two preceding images. Sequences of signals at the output 31 from the difference calculator 56 correspond to images like that shown in FIG. 3C. Such sequences thus correspond to movement by the subject to be displayed. This thus represents a reduction in the volume of information that needs to be transmitted when compared to the static contour image.

In this respect, other image compression techniques may be used depending on the modifications which are found to occur from one image to the next and on the experience accumulated while transmitting preceding images. In particular, more than one previous image may be taken into account. Known techniques for analysing movement can be used to take several preceding images to predict the current image. In such cases, the information transmitted concerns only the difference between the actual image and the predicted image. Clearly such techniques require more complicated means to replace the XOR function 56, but have the advantage of providing greater compression for use with a telephone line. Suitable means are described in an article by H. M. Nagel entitled "Analysis Techniques for Image Sequences" in Proc. Int. Joint Conf. on Pattern Recognition Kyoto, Japan, 1978, and in a book edited by T. S. Huang, entitled "Image Sequence Analysis" published by Springer, Berlin, 1981.

The sequence of signals at the output 31 includes two kinds of information: firstly there are signals corresponding to definite movement of various parts of the contour between successive images, these signals contain the information to be tansmitted; and secondly there are numerous "isolated point" signals due to small and inevitable contrast differences in a system using a camera 20 of the type described. FIG. 3C shows such isolated points in addition to the definite movements. Definite movement is essentially restricted to the hands and arms. Some isolated points are scattered at relatively low density over the entire body and background. In contrast there is a high density of "isolated" points in the subject's face. This is due to the mobility of the face when speaking, and such mobility is itself a significant feature of signal language as well as being the essential feature of communication by lip reading.

The filter 34 thus has two functions: firstly it must eliminate isolated points in areas of low density where the points correspond to little movement, if any; and secondly it must retain points in high density regions, which in practise means in the face.

Figure 4:
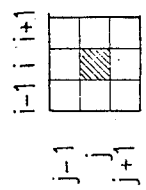

The filter detects isolated points by means of a window function as shown in FIG. 4. The window shows the values of an image variable in the neighborhood of a current point of interest. In FIG. 4 a 3×3 point window is used. Given a point of interest i,j in the matrix of image points being applied serially to the input of the filter, points which fall in the intersection of columns $i-1$ to $i+1$ by lines $j-1$ to $j+1$ are taken into consideration. Let X be the property of being a difference point, ie. a point corresponding to a change from a 0 to 1 or from a 1 to 0 in the sequence of signals present on the output 31, as indicated above. $X_{is}$ is defined as the property of being an isolated difference point, corresponding to the configuration shown in FIG. 4 where the value of X is different for the point i,j than for all the surrounding points in the window under consideration. In Boolean algebra:

$$X_{is} = \overline{X}_{i-1,j-1} \cdot \overline{X}_{i-1,j} \cdot \overline{X}_{i-1,j+1} \cdot \overline{X}_{i,j-1} \cdot X_{i,j} \cdot \overline{X}_{i,j+1} \cdot \overline{X}_{i+1,j-1} \cdot \overline{X}_{i+1,j} \cdot \overline{X}_{i+1,j+1}$$

where $\overline{X}$ indicates absence of the property.

Thus the signals applied to the input of the filter 34 may thus be processed as defined above, eg. by means of a memory and by selective interrogation of the signals thus stored as a function of the selected window. An integrated circuit or a suitably programmed microprocessor is used to to control the operation.

Figure 5:
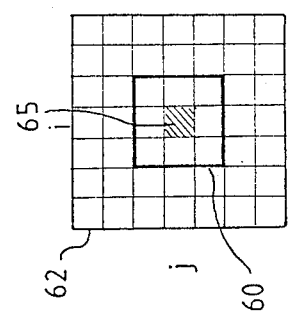
FIGS. 4 and 5 show "windows" used in a filtering stage.

Having thus detected isolated difference points in a sequence, the device analyses the density of such points over the image as a whole to reject only those isolated points which are in regions having less than a predetermined threshold density. This is done by using a larger window as shown in FIG. 5 which uses a 7×7 matrix. The window is only used for observing "isolated" points as determined by a window 60 identical to the window of FIG. 4. The window 60 is at the center of the FIG. 5 window 62, and for density measurements, only the 40 points in the window 62 which surround the window 65 are taken into consideration.

Figure 6B:
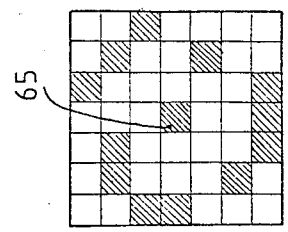
FIGS. 6A and 6B show two different situations for a FIG. 5 window.
Figure 6A:
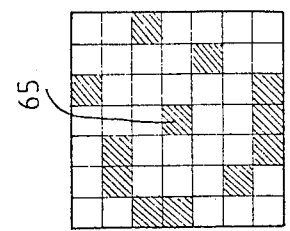

Density is calculated by counting the number of difference points in said 40 points and then comparing the total count with a threshold. Supposing a threshold of 30% is used, an isolated point 65 will not be retained if fewer than 12 difference points are counted in the surrounding 40 points of the window under test. Such a situation is shown in FIG. 6A. Otherwise, and as shown in FIG. 6B, there are at least 12 difference points in the surrounding 40, in which case the isolated point 65 is retained and a corresponding signal is transmitted to the output 57 of the filter 34 towards the input 58 of the coder 36.

Thus, the function for detecting isolated points $X_{is}$ is applied successively to all the difference points of the image. However, the density threshold function is applied only to points which have already been detected as possible isolated points.

The filter 34 removes genuinely isolated points from the image by applying a signal to an output 59 which is fed via a line 70 to an input 72 of the memory 50, to cause the memory to invert the content of the corresponding location. The reason for this degree of feedback is explained more fully below.

The coder 36 encodes the sequence of signals appearing at its input 58 for each image. Several different methods exist for compressing sequential information representative of a black and white image. The sequential data present on the input 58 is converted into a series of digital words on an output 37 for transmission over the line 15 by the interface 14. One method is "run length" encoding in which each white to black transition (0 to 1) gives rise to a special code followed by a code for the immediately following black to white transition which code includes the number of points between said transitions. Other encoding systems can give even greater compression, eg. block or quad-tree type encoding. Several such encoding methods are described in the July 1980 issue of the journal "Proceedings of the IEEE" which was a special graphic image encoding issue.

At the receiver, the sequences of signals appearing at the receiver output 39 from the interface 14 are of the same kind as the sequences transmitted by the coder 36, but they come from a coder 36 in another instrument connected to some other line in the telephone network to which the line 15 is connected. The received signals are decoded by a decoder 40 which applies the inverse function to that used by the coder 36. When the decoded signals at the output 42 correspond to difference points between consecutive images, they are applied to the input 75 of a device 76 for reconstituting the image inside the image information restoring device 44. Said restoring device 44 also includes a memory 78 having an input 77 connected to the output 79 from the reconstituting device 76. The output 81 from the memory is connected to the input 45 of a display screen 46 which may be constituted by a cathode ray tube or the like as used in computer terminals.

The memory 78 is preferably not limited in capacity to a single image. It should be capable of storing several complete successive images suitable for being applied one after the other to the output 81 to feed the display. In particular it should include a portion of memory which is directly addressable from the input 77 for reconstituting each image during reception.

The image may be reconstituted in a manner symmetrical to the decomposition performed by the memory extractor 30. Thus for each sequence at the input 75 corresponding to a current image, the reconstituting device 76 receives a second signal on a second input 82 connected to deliver the corresponding signal from the previously reconstituted image as stored in the memory 78 and output via an output 83. The signals applied to the inputs 75 and 82 of the device 76 are synchronised in such a manner as to enable a complete contour image to be reconstituted point by point, with each corresponding bit in the previous image being updated by the bit present at the input 75. A sequence of reconstituted images is thus stored in the memory 78. It should be observed that by virtue of some of the isolated points being eliminated by the filter 34, the reconstituted image would not be an exact reproduction of the image in the memory 50 of the transmitter if the corresponding isolated point had not been inverted in the memory 50.

The data compression techniques mentioned above for use by the coder 36 introduce a variable delay in image transmission time. Further, decoding by the decoder 40 and reconstitution by the device 44 which requires knowledge of a complete prior image in addition to reception of information concerning the current image both add a certain delay between the time when information begins to be received at the interface output 36 and the appearance of a complete image on the screen 46. If several images are stored digitally in the memory 78, at least the image redrawing rate can be kept substantially uniform on the screen in spite of the variable overall transmission rate and necessarily with some delay. The redrawing rate at the screen 46 can then be synchronised with the rate at which images are generated by the camera 20, even though some individual images take longer to transmit than others.

Further, because of the overall delay inherent to filling all the stages of buffer memory in the chain, there is a definite dead period after a call begins and the appearance of a complete image on the screen. This dead period can be filled-in by an alphnumeric message which may identify the caller by name or by number or both. Thus the called party can receive some information concerning the visual communication which is about to begin.

A permanent re-initialization device is also provided for re-initializing the displayed image during transmission. There will inevitably be transmission errors or interference, and this could lead to the image being progressively degraded. To avoid this phenomenon, a small portion of each image from the contour extractor 25 or from the sampler 28 is transmitted in full to the interface input 38, by a line not shown, to update the corresponding receiver image. The updating information may concern about 1% of each image, say one complete line thereof, and replaces a portion of the compressed data from the coder 37. On reception, the corresponding portions transmitted in full are forwarded, again by means not shown, to an appropriate point downstream from the reconstituting device 76 to reinitialize the corresponding image line. Suitable signals are naturally tansmitted to announce the beginning and the end of each portion transmitted "in the clear" to enable the portions to be properly located. The "clear" information is thus used to update the entire transmitted image over a period of 100 sequences (supposing a 1% clear rate as outlined above).

FIG. 1 shows a dashed box 90 inserted between the memory 78 and the screen 46. The dashed box represents an optional image enhancement device suitable for smoothing between points, thereby improving the continuity of the contour lines and reducing jerkiness in points which move from one image to the next. Such devices are known in the art.

In addition to the application outlined above of enabling the deaf to communicate over telephone lines, the invention can also be used for real time transmission over telephone or telematics lines of any other phenomena which require image renewal at a rate similar to or less than that needed for displaying movement of the human body. In particular, it may beused whenever information can advantageously be transmitted in the form of line drawings rather than in the form of halftone images. The invention can be used for transmitting animated cartoons per se, and it can be used for improving the quality of video-conferencing as mentioned above.

Clearly the invention as not even limited to the transmission of images over a distance, and it can profitably be used, for example, simply to compress low data rate digital data for deferred transmission or reconstitution.

We claim:

1. In an apparatus for generating signals in real time representative of visual information, in particular visual information relating to movements of the human body, the apparatus being of the type comprising: a camera suitable for forming successive images and for converting each such image into a sequence of corresponding electrical signals; binary conversion means for converting the signal representative of each point in the sequence into binary form; and encoding means for encoding the resulting sequences of binary signals, the improvement which includes means for compressing said signals to a data rate compatible with transmission over an ordinary telephone line by virtue of said binary conversion means which link the camera to the encoding means, said means for compressing comprising means responsive to changes in brightness between neighboring points within each image to extract contours present in the original image, said binary signals then being representative of said extracted contours.

2. Apparatus according to claim 1, including sampling means connected to receive the output signal from the contour extracting device, said sampling means being connected to select signals relating to certain points only in such a manner as to reduce the contour image by a predetermined factor.

3. Apparatus according to claim 1, wherein the data rate at the output from the encoding means is not greater than 4,800 bauds.

4. Apparatus according to claim 1, further including compression means linking the output from the contour extractor device to the encoder means, said compression means comprising movement selecting means for selecting information representative of contour movement.

5. Apparatus according to claim 4, wherein said movement selecting means includes means for performing point-by-point comparison of each successive contour image with the preceding contour image.

6. Apparatus according to claim 1, further including filter means for filtering out signals representing isolated points in said contour images.

7. Apparatus according to claim 4, further including filter means connected to receive the output signal from said movement selecting means filter out signals from each image sequence representative of modifications of information from one image to the next and relating to points which are isolated in the image.

8. Apparatus according to claim 7, wherein said filter means operates to filter out information concerning isolated points only when the density of points surrounding said isolated points is below a predetermined threshold.

9. Apparatus according to claim 7, wherein said movement selecting means comprises a memory for storing information relating to points in the image preceding the current image, and wherein means are provided for correcting the information stored in said memory to correspond with the image signal applied to the encoding means after rejection of isolated points.

10. The separation defined in claim 1 in a transmitter/receiver system for producing signals representative of visual information at a rate compatible with transmission over telephone type lines, said visual information being in particular representative of movement of the human body, and said receiver being suitable for receiving such signals and for displaying animated cartoon type images representative of said movement, further comprising means for connecting said encoder to an interface for connection to a telecommunications line, together with a receiver also suitable for connection to said interface and including means for decoding signals received serially via said interface from a telecommunications line and for feeding signals to a device for displaying successive images.

11. A system according to claim 10, wherein the transmitted digitally encoded signals convey binary information relating to image points which have changed since the preceding image to be transmitted, and wherein the receiver includes a memory for storing a sequence of signals representative of the preceding image, and a device for reconstituting the current image on the basis of the received signals and the stored image signals, said reconstituting device being connected to feed image data into said memory and the display means being connected to read data from said memory.

12. A system according to claim 10 or 11, wherein the receiver includes a digital memory having a capacity corresponding to a plurality of successive contour images in addition to the image being reconstituted, thereby enabling successive images to be displayed at a substantially uniform rate in spite of differences in the time taken to transmit successive images.

13. A method for transmitting information based on movements of the human body, between a first and a second station, remote from each other, said method comprising the steps of:
(a) acquiring at said first station video signals representing successive images of said human body;
(b) converting said video signals into first digital signals, each corresponding to a point in one of said successive images;
(c) processing said digitial siganls, within each image, to determine for each point of the image, a binary signal indicating whether that point belongs to a contour of said image;
(d) encoding such binary signals indicating a contour point into second digital signals;
(e) transmitting said second digital signals to said second station through a telecommunication network;
(f) receiving said second digital signals at said second station;
(g) reconstituting the contours of the successive images, at said second station, from said second digital signals, and
(h) displaying the contour images at the second station.

14. The method according to claim 13, wherein step (e) further comprises transmitting alphanumeric information, at least during the initial transmission period, while step (g) is reconstituting a first full image to be displayed, and step (h) comprises displaying said alphanumeric information.

15. The method according to claim 13, further comprising also implementing said steps (a) to (h) from the second station to the first station.

16. The method according to claim 13, wherein said step (d) of encoding comprises:
sampling said binary signals of the image by blocks of adjacent points, and
forming a reduced binary signal from the binary signals corresponding to the points in each block.

17. The method according to claim 16, wherein step (d) further comprises:
encoding the binary signals indicating a contour point in a second portion of the current image into second digital signals for said second portion, which is disjointed from said first portion;
said step (g) comprises:
reconstituting the second portion of the current image from the correspondingly received binary signals; and
storing these as an updating of the second portion of the preceding image;
said first and second portions being varied from one image transmission to another, so as to have the stored preceding image entirely refreshed over a predetermined period of time.

18. The method according to claim 16 wherein said step (d) of encoding comprises:
- storing the binary signals corresponding to at least one preceding image,
- comparing the binary signals in a first portion of the current image, for each respective point in said portions;
- forming those of said second digital signals corresponding to the first image portion only for binary signals of the current image being different from the corresponding ones in the preceding image; and
- updating said stored preceding image with such different binary signals in the first portion of said stored image; and step (g) of reconstituting comprises:
- storing the binary signals received corresponding to at least one preceding image; and
- reconstituting said first portion of the current image by updating the same portion of the preceding image with the binary signals received for the first portion of the current image.

19. The method according to claim 18, wherein step (d) of encoding comprises:
- filtering out those of said different binary signals which correspond to substantially isolated points;
- forming said second digital signals from the unfiltered ones of said different binary signals; and
- inverting in said stored preceding image of the first station, the binary signals corresponding to said filtered out binary signals of the current image.

* * * * *